US006462493B2

(12) United States Patent
Lan

(10) Patent No.: US 6,462,493 B2
(45) Date of Patent: Oct. 8, 2002

(54) DRIVING CONTROL APPARATUS OF MOTORIZED SCOOTER

(76) Inventor: Mey-Chu Lan, 7F, No. 6, Lane 20, Sec. 4, San Ho Rd., San-Chung City, Taipei Hsien (TW)

(*) Notice: Subject to any disclaimer, the term of this patent is extended or adjusted under 35 U.S.C. 154(b) by 31 days.

(21) Appl. No.: 09/825,226

(22) Filed: Apr. 2, 2001

(65) Prior Publication Data

US 2002/0117341 A1 Aug. 29, 2002

(30) Foreign Application Priority Data

Feb. 14, 2001 (TW) ........................................ 90202198 U

(51) Int. Cl.$^7$ .............................................. B62K 23/00
(52) U.S. Cl. ........................ 318/272; 318/459; 318/500; 318/520; 180/220
(58) Field of Search ................................ 318/268, 272, 318/459, 500, 519, 520, 434; 180/218, 219, 220

(56) References Cited

U.S. PATENT DOCUMENTS

| 5,730,243 A | * | 3/1998 | Koike et al. | ................ | 180/220 |
| 5,818,195 A | * | 10/1998 | Frick et al. | ................ | 318/771 |
| 5,912,545 A | * | 6/1999 | Monet et al. | ................ | 320/107 |
| 5,991,505 A | * | 11/1999 | Frank | ......................... | 388/828 |
| 6,347,681 B1 | * | 2/2002 | Patmont et al. | ............. | 180/220 |

* cited by examiner

*Primary Examiner*—Bentsu Ro
(74) *Attorney, Agent, or Firm*—Pro-Techtor International Services

(57) ABSTRACT

The present invention herein relates to a driving control apparatus of motorized scooter comprised of battery, driving unit, and motor, characterized in which the driving unit consists of at least a relay, a start-up and protective circuit, an under-voltage protective circuit, a power switch and speed control circuit, and a braking unit, that when the power switch and speed control circuit are on, and the relay is open, user may push the wheels of the scooter manually to drive the motor; when a set speed is reached and the relay is closed, the motor is driven directly, controlling the speed of the scooter, in addition, when the speed of the scooter is below a certain rate, the relay will be opened to stop the motor; at this time, the user may restart the motor by pushing the wheels of the scooter manually to move the scooter forward.

3 Claims, 4 Drawing Sheets

DRIVING CONTROL APPARATUS OF MOTORIZED SCOOTER

BACKGROUND OF THE INVENTION

1) Field of the Invention

The invention herein relates to a kind of driving control apparatus of motorized scooter, particularly a kind of apparatus that uses the speed discrepancy of wheels generated when the scooter moves to control the start and stop of motor, and provides better circuit protection.

2) Description of the Art

Common circuit control of motorized scooter (FIG. 1) has a power switch and speed control device (C) between motor (A) and battery (B) for start-up and control of acceleration and deceleration. Furthermore, a mechanical braking device (D) is arranged to stop the wheels (not shown in the figure) and control the power output of motor connected to the wheels to attain the purpose of moving or stopping the scooter. Such circuit control is serviceable, but has the following deficiencies:

1. When the power switch and speed control device (C) is on, the motor (A) is energized instantly and ready to move, and the input current and tuning speed of motor (A) are controlled through the modulation of power switch and speed control device (C). As such, power is consumed regardless whether the scooter is paused or idle. Also in the instant when the scooter intends to generate motion from rest, maximum torque is required. At this time, the user must drive the power switch and speed control device (C) to obtain and input the maximum current required by the motor (A), which tends to increase the power consumption for starting up the motor, leading to low efficiency of power use and low mileage.

2. As described above, when the power switch and speed control device (C) is on, the motor is instantly energized. If the user inadvertently touches said power switch and speed control device (C), the scooter will thrust forward. Also, when the user uses the braking device (D) to stop the wheels, the motor (A) has reduced power output, but is still energized and in idle state while the scooter is decelerating, which tends to increase the braking distance and does not aid in the braking.

3. When the power switch and speed control device (C) is on, the motor (A) is in constant energized and ready state. The user has no need or is unable to drive the scooter manually if he or she so desires, thus losing the fun of sporting in riding a scooter.

Thus the inventor hopes to improve the deficiency of the prior arts, and has come up with the present invention after incessant studies, which will be described in detail with he illustration of drawings below.

DETAILED DESCRIPTION OF THE PREFERRED EMBODIMENT

Figure 1:
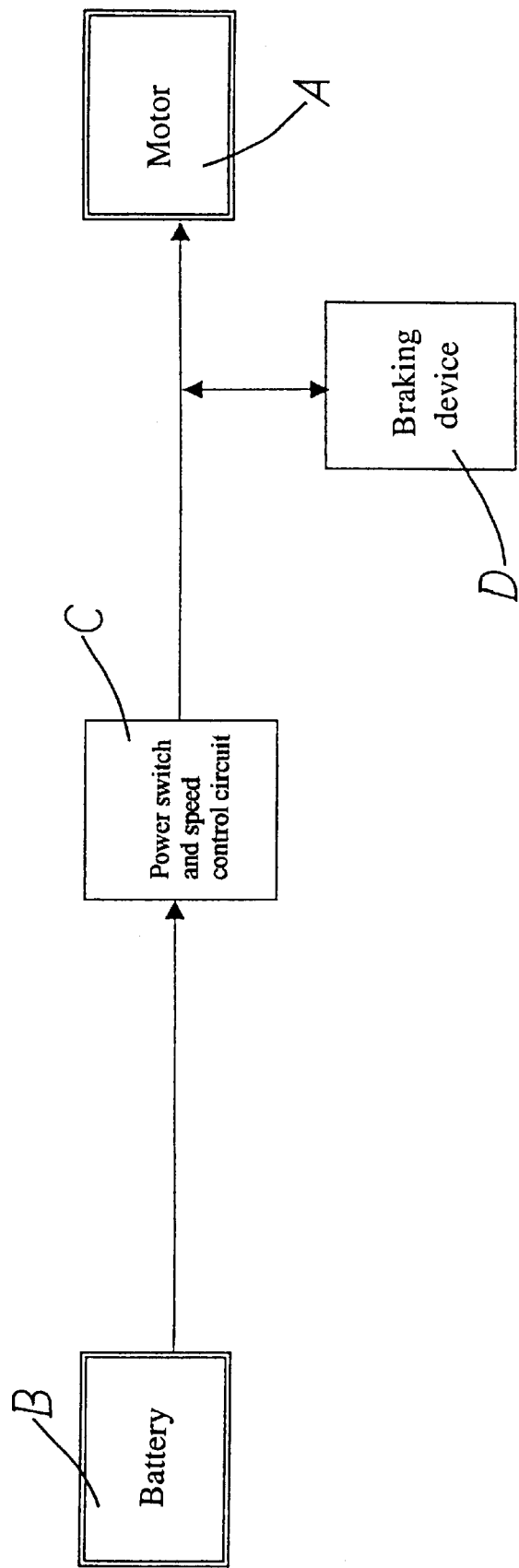
FIG. 1 is a block diagram of the circuitry of motorized scooter of prior arts.
Figure 2:
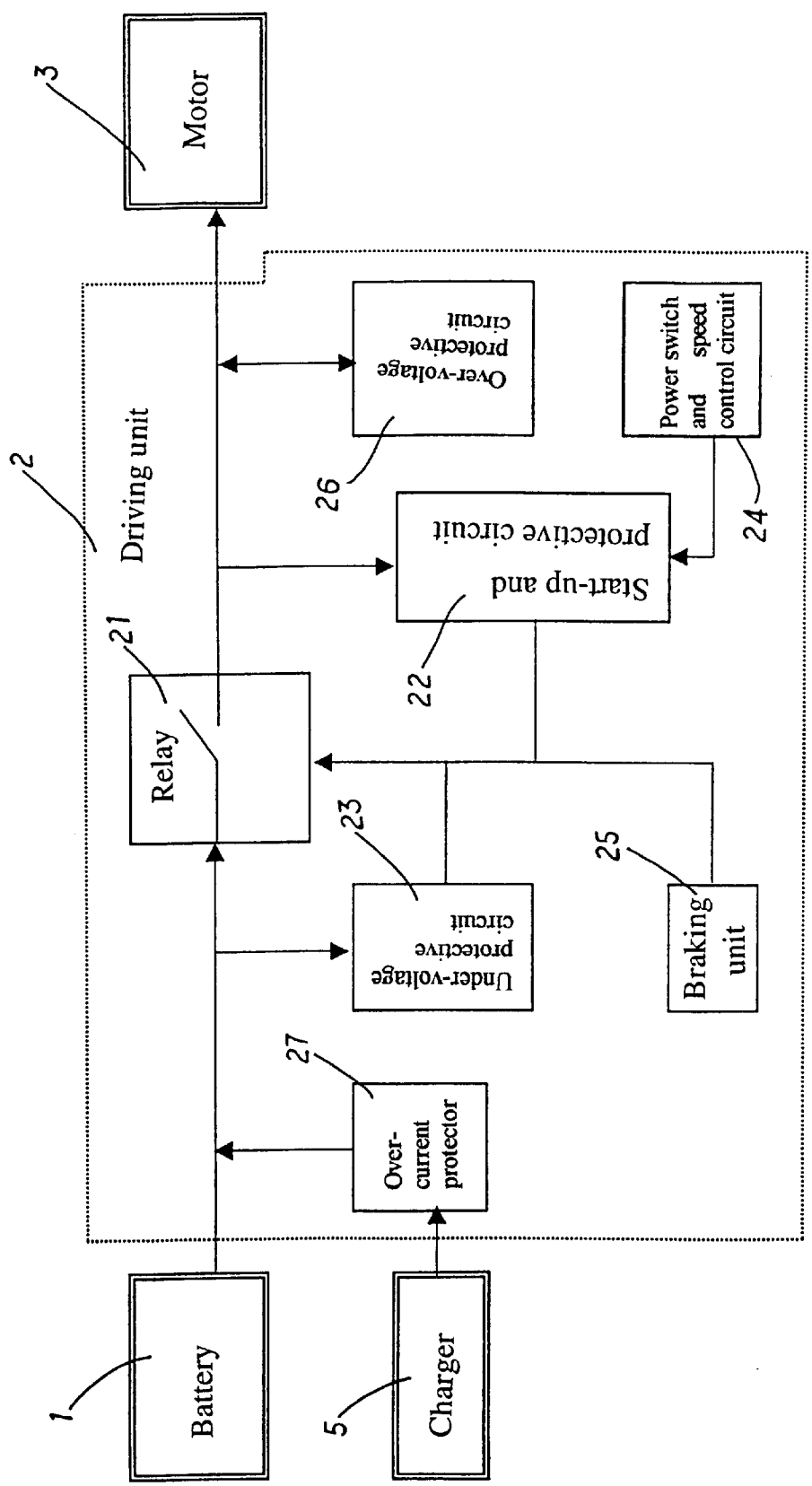
FIG. 2 is a block diagram of circuitry of the invention herein.
Figure 3:
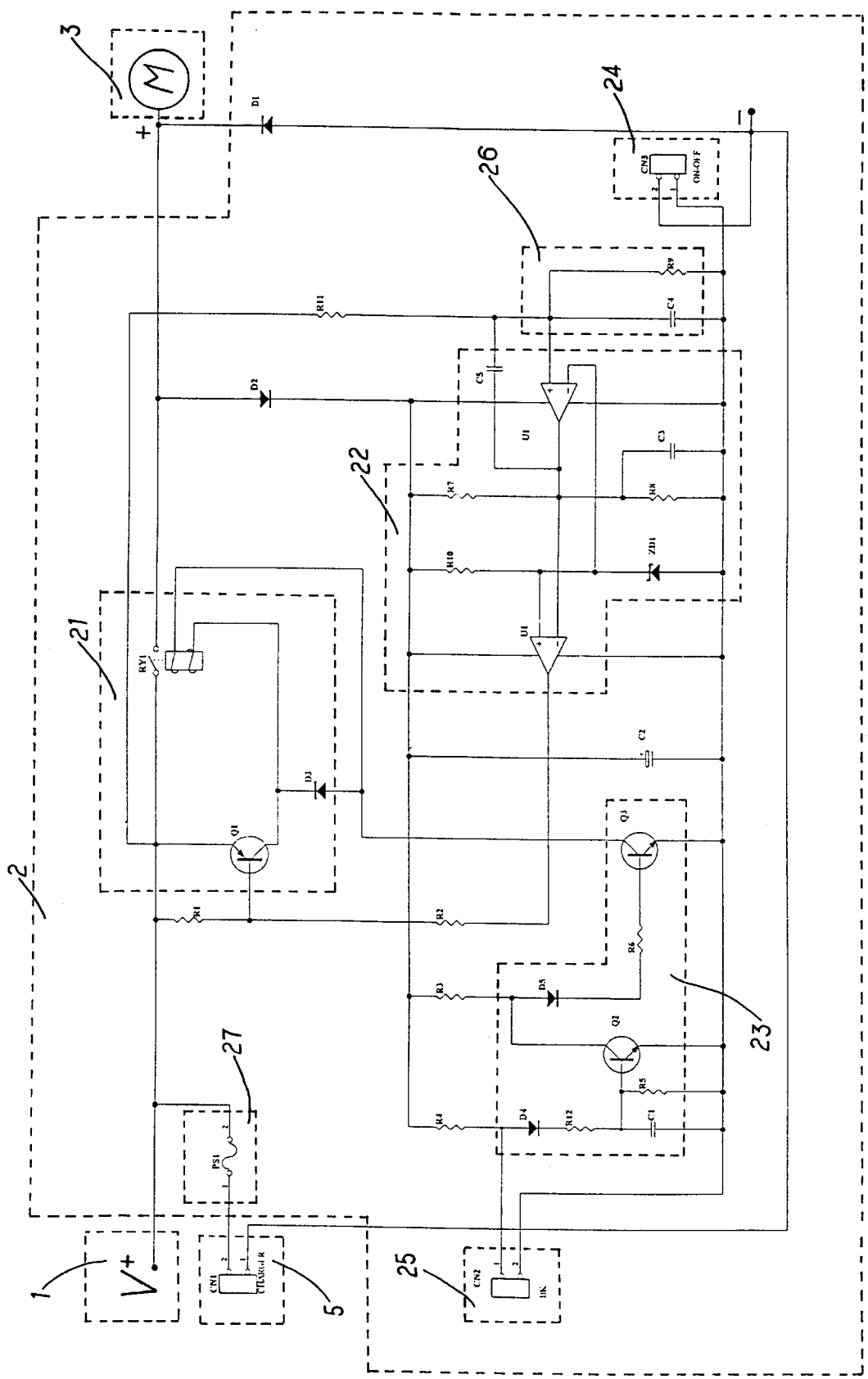
FIG. 3 is a diagram of electronic circuitry of a preferred embodiment of the invention herein.
Figure 4:
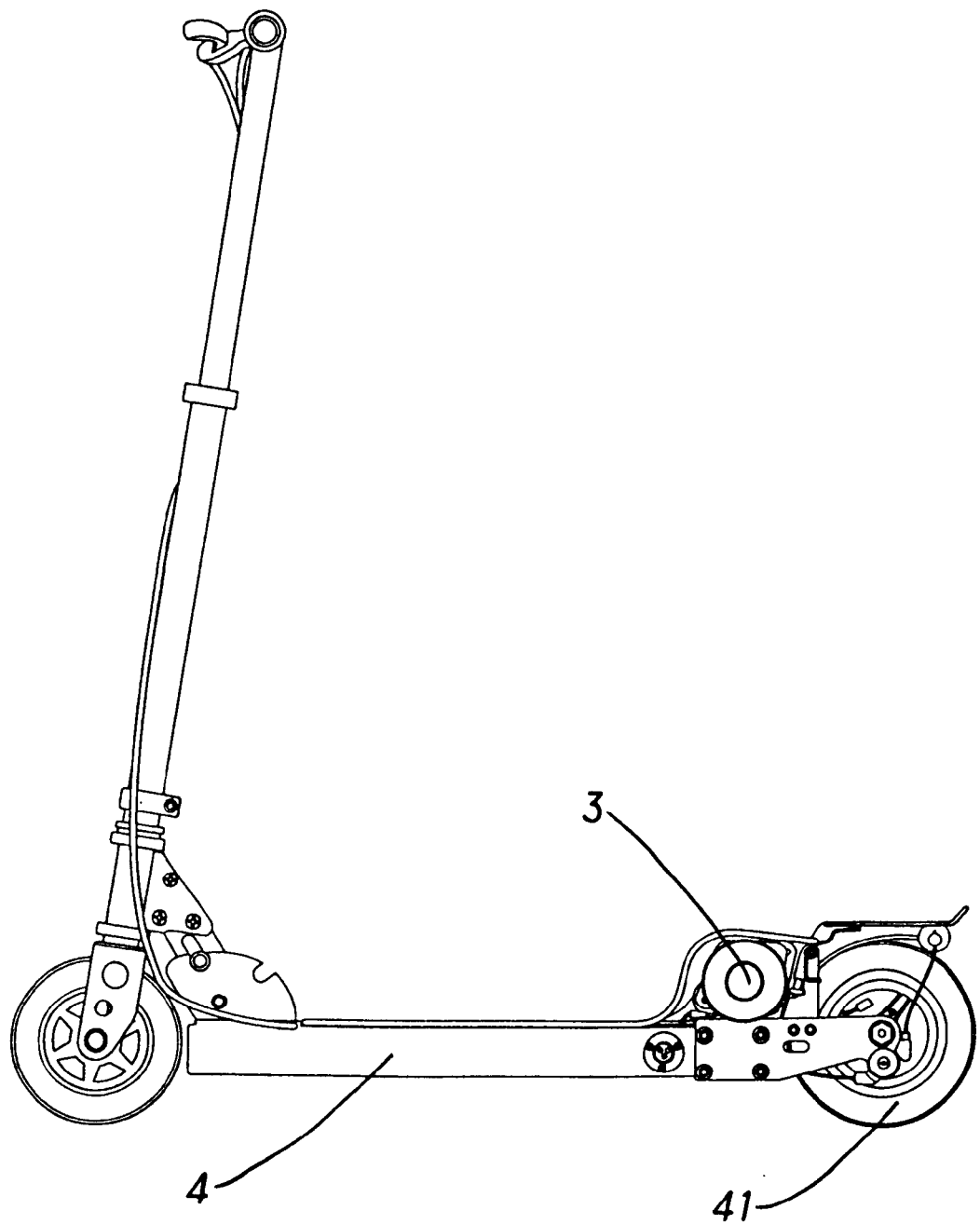
FIG. 4 is an outside drawing of a preferred embodiment of the invention herein.

Referring to FIGS. 2~4, the driving control apparatus of motorized scooter provided herein comprises of battery (1), driving unit (2), and motor (3), wherein, the driving unit (2) is connected with battery (1), and supplies the power required by the motor (3), characterized in which said driving unit (2) comprises at least a relay (21), a start-up and protective circuit (22), an under-voltage protective circuit (23), a power switch and speed control circuit (42), and a braking unit (25), and one end of said relay (21) is connected with battery (1). When the power switch and speed control circuit (24) is on, and the relay (21) is in open state, user can push the wheels (41) of the scooter (4) manually to drive the motor (3), causing the motor (3) to generate counter electromotive force on account of its internal coil resistance and passive turning of armature. When a set speed is reached, said counter electromotive force and the weak current it generates will actuate the start-up and protective circuit (22), and close the relay (21), so the current of the battery (1) can pass through the relay (21) to drive the motor directly (3). At the same time, the user can use the power switch and speed control circuit (24) and the braking unit (25) respectively to control the current input of motor (3); so as to control the acceleration, deceleration, and speed of the scooter (4). Also, when the voltage output of battery (1) to the motor (3) is reduced significantly, the under-voltage protective circuit (23) will open the relay (21) immediately after receiving said voltage value, so the motor (3) will stop turning due to the lack of current flow. At this time, the user may, depending on actual needs, use the braking unit (25) to stop the scooter (4), or restart the scooter by pushing its wheels (41) manually to let the motor turn passively (3); when the aforesaid set speed is reached, the relay (21) is closed, so the current of battery (1) may pass through the relay to drive the motor (3) directly, thereby moving the scooter (4) forward. In addition, the invention herein features an over-voltage protective circuit (26) side connected between the relay (21) of the driving unit (2) and the motor (3), so that when the motor (3) is overloaded, said over-voltage protective circuit will receive the voltage value, and open the relay (21) immediately to protect the safety of the motor (3) and driving unit (2). Also to offer facility and convenience in handing, this invention has a charger (5) set up to charge the battery (1), and arranges an over-current protector (27) between said charger (5) and battery (1), that when the current charged from the charger (5) to the battery (1) exceeds the rated current, said over-current protector (27) will break circuit automatically so as to protect the safety of the battery (1), the driving unit (2), and the motor (3).

Referring to FIGS. 3~4 which illustrate the electronic circuitry and outside appearance of a preferred embodiment of this invention, it is seen that said driving unit (2) is connected with battery (1), and supplies the power needed by the motor (3). When the power switch and speed control circuit (24) is on, and the relay (2) is in open state, the user may push the wheels (41) of the scooter (4) manually to drive the motor (3), causing it to produce counter electromotive force; when a set speed is reached, said counter electromotive force and the weak current it generates will go through diode D2 and input to the reference voltage and voltage input terminal of start-up and protective circuit (22) composed of U1 and U2, so said circuit is actuated to pass through Q1 and switch on the relay (21) to let the current of battery (1) pass through the relay (21) to drive the motor (3) directly. At the same time, user can control the acceleration, deceleration and speed of the scooter via the power switch and speed control circuit (24) and the braking unit (25) respectively. When the speed of the scooter is reduced to a certain rate, the voltage output of battery (1) to motor (3) is lowered significantly. Consequently, the under-voltage protective circuit (23) comprised of Q2 and Q3 will open the relay (21) after receiving said voltage value, so the motor (3) will stop due to the absence of current flow. At this time, the user may, depending on actual needs, stop the scooter (4) with braking unit (25), or re-start the scooter (4) by pushing its wheels (41) manually, which will drive the motor (3) to turn passively, that when the aforesaid set speed is reached the relay (3) is closed again. Also an over-voltage protective circuit (26) comprised of C4 and R9 is side connected between the relay (21) and the motor (3), that when it detects overload of the motor (3), it will open the relay (21) to protect the motor (3) and the driving unit (2). In addition, the battery (1) may be charged by a charger (5), and an over-current protector consisted of fuse PSI is arranged between said charger (5) and battery (1), that when the current charge from the charger (5) to the battery (1) exceeds the rated current, the over-current protector (27) will break circuit immediately to protect the safety of battery (1), driving unit (2), and motor (3).

As described above, the invention herein possesses the following enhancements:

1. The user can start the scooter without turning the key by pushing it to drive the motor and let it turn passively to generate counter electromotive force and weak current, making the start of the scooter easy and handling fun; also, when the scooter speed is reduced to a certain rate, the relay is open and power is cut off automatically to greatly reduce energy consumption during starting or stopping, thus boosting power efficiency and the mileage.
2. When the scooter speed is reduced to a certain rate, the power of motor is cut off. At this time, the motor is in passive drive that provides proper check force to the wheels with its internal coil resistance and magneto-resistance of armature, thus aiding the braking of scooter, reducing the braking distance and enhancing the safety of driving.
3. In coordination with speed increase or decrease, the motor of scooter can be started to compensate power or cut off power to provide aid to braking, thus possessing smart performance. Moreover, this invention offers manual and electric drive modes, thus offering the dual effects of exercise and riding.
4. This invention comes with automatic protective functions that the relay will be cut off when the motor is overload or overcharged, thus the battery, driving unit and motor are protected.

What is claimed is:

1. A kind of driving control apparatus of motorized scooter comprised of battery, driving unit, and motor, wherein the driving unit is connected with battery and supplies the power required by the motor, characterized in that said driving unit comprises at least a relay, a start-up and protective circuit, an under-voltage protective circuit, a power switch and speed control circuit, and a braking unit; and one end of said relay is connected with battery, that when the power switch and speed control circuit is on, and the relay is in open state, user can push the wheels of the scooter manually to drive the motor, causing the motor to generate counter electromotive force with its internal coil resistance and passive turning of armature, and when a set speed is reached, said counter electromotive force and the weak current it generates will actuate the start-up and protective circuit, and close the relay, so the current of the battery can pass through the relay to drive the motor directly; at the same time, the user can use the power switch and speed control circuit and the braking unit respectively to control the current input of motor, so as to control the acceleration, deceleration, and speed of the scooter; also, when the voltage output of battery to the motor is reduced significantly, the under-voltage protective circuit will open the relay immediately after receiving said voltage value, so the motor will stop turning due to the lack of current flow; at this time, the user may, depending on actual needs, use the braking unit to stop the scooter, or restart the scooter by pushing its wheels manually to let the motor turn passively; when the aforesaid set speed is reached, the relay is closed, so the current of battery may pass through the relay to drive the motor directly, thereby moving the scooter forward.

2. A kind of driving control apparatus of motorized scooter of claim 1, wherein said driving unit has an over-voltage protective circuit being side connected between the relay of the driving unit and the motor, so that when the motor is overloaded, said over-voltage protective circuit will receive the voltage value, and open the relay immediately to protect the safety of the motor and driving unit.

3. A kind of driving control apparatus of motored scooter of claim 1, wherein said battery may be charged by a charger, and an over-current protector is arranged between said charger and battery, that when the current charged from the charger to the battery exceeds the rated current, said over-current protector will break circuit automatically so as to protect the safety of the battery, the driving unit, and the motor.

* * * * *